(12) United States Patent
Blumenberg

(10) Patent No.: US 9,322,665 B2
(45) Date of Patent: Apr. 26, 2016

(54) SYSTEM AND METHOD FOR NAVIGATION WITH INERTIAL CHARACTERISTICS

(75) Inventor: Christopher Blumenberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 13/609,779

(22) Filed: Sep. 11, 2012

(65) Prior Publication Data

US 2013/0325322 A1 Dec. 5, 2013

Related U.S. Application Data

(60) Provisional application No. 61/655,853, filed on Jun. 5, 2012.

(51) Int. Cl.
| | | |
|---|---|---|
| *G01C 21/26* | (2006.01) | |
| *G01C 21/36* | (2006.01) | |
| *G01C 21/34* | (2006.01) | |

(52) U.S. Cl.
CPC .................................. *G01C 21/367* (2013.01)

(58) Field of Classification Search
None
See application file for complete search history.

(56) References Cited

U.S. PATENT DOCUMENTS

| | | | | |
|---|---|---|---|---|
| 4,835,694 A * | 5/1989 | Yamamoto et al. | ............. | 701/63 |
| 5,004,082 A * | 4/1991 | Sakakibara et al. | ......... | 192/3.26 |
| 5,788,599 A * | 8/1998 | Adachi et al. | ................... | 477/45 |
| 5,857,937 A * | 1/1999 | Ashizawa et al. | ............... | 477/46 |
| 6,028,600 A * | 2/2000 | Rosin | ................ | H04N 5/44543 348/38 |
| 6,163,752 A * | 12/2000 | Sievers | ................ | G09B 29/106 340/988 |
| 6,208,131 B1 * | 3/2001 | Cebis | .................... | F02D 41/009 123/406.58 |
| 6,217,469 B1 * | 4/2001 | Sawada et al. | ................... | 474/28 |
| 6,227,998 B1 * | 5/2001 | Iwao et al. | ....................... | 477/79 |
| 6,428,444 B1 * | 8/2002 | Tabata | .............................. | 477/3 |
| 6,942,598 B2 * | 9/2005 | Kondo et al. | ................. | 477/169 |
| 7,134,536 B2 * | 11/2006 | Morise et al. | ................ | 192/3.58 |
| 7,167,779 B2 * | 1/2007 | Kashiwada | ............ | G02B 27/01 340/435 |
| 7,255,212 B2 * | 8/2007 | Morise et al. | ................ | 192/3.58 |
| 7,361,120 B2 * | 4/2008 | Iida et al. | ......................... | 477/65 |
| 7,366,995 B2 * | 4/2008 | Montague | ........... | G06F 3/04845 715/769 |
| 7,427,254 B2 * | 9/2008 | Iwatsuki et al. | ................. | 477/92 |
| 7,568,995 B2 * | 8/2009 | Soga et al. | ....................... | 477/45 |
| 7,682,276 B2 * | 3/2010 | Nozaki et al. | ................. | 475/123 |

(Continued)

OTHER PUBLICATIONS

International Search Report and Written Opinion in application No. PCT/US2013/043833 mailed Aug. 29, 2013 pp. 1-9.

*Primary Examiner* — John R Olszewski
*Assistant Examiner* — Jean-Paul Cass
(74) *Attorney, Agent, or Firm* — Robert C. Kowert; Meyertons, Hood, Kivlin, Kowert & Goetzel, P.C.

(57) ABSTRACT

Embodiments of a system and method for navigation with inertial characteristics are described. Embodiments may include a navigation component configured to generate a map display including at least a portion of a map and a position indicator representing a location of a user on the map. The position indicator may be positioned in a first position relative to the map display. The navigation component may be configured to detect that the user is turning in a direction of travel. The navigation component may also be configured to, responsive to the detection that the user is turning in the specific direction of travel, shift the position indicator within the map display in a direction opposite to the detected direction of travel. The shifting may cause additional map information to be displayed in the direction of travel. In various embodiments, the position indicator may be returned to the first position post-turn.

24 Claims, 11 Drawing Sheets

(56) References Cited

U.S. PATENT DOCUMENTS

| | | | |
|---|---|---|---|
| 7,730,425 B2* | 6/2010 | de los Reyes | G06F 9/4443 715/834 |
| 7,739,617 B2* | 6/2010 | Ording | G06F 3/0481 715/766 |
| 7,835,857 B2 | 11/2010 | Gretton | |
| 7,966,124 B2* | 6/2011 | Liu | G09B 29/106 701/457 |
| 8,291,341 B2* | 10/2012 | Tseng | G06F 1/1624 345/173 |
| 8,319,746 B1* | 11/2012 | Ho | G06F 3/0418 345/156 |
| 8,327,272 B2* | 12/2012 | Anzures | G06F 1/1626 715/731 |
| 8,365,074 B1* | 1/2013 | Wagner | G06F 3/0488 345/661 |
| 8,570,329 B1* | 10/2013 | Ofstad | G06T 13/20 345/473 |
| 8,635,545 B2* | 1/2014 | Kim | G06F 3/0488 715/764 |
| 8,643,951 B1* | 2/2014 | Wheeler | G06F 3/012 359/630 |
| 8,769,400 B1* | 7/2014 | Thomas | G06F 17/248 715/235 |
| 2002/0032696 A1* | 3/2002 | Takiguchi | G06F 17/30126 715/255 |
| 2003/0148772 A1 | 8/2003 | Ben-Ari | |
| 2004/0043863 A1* | 3/2004 | Kondo et al. | 477/38 |
| 2005/0047629 A1* | 3/2005 | Farrell | G06F 3/013 382/117 |
| 2006/0058126 A1* | 3/2006 | Faust | 474/8 |
| 2006/0058128 A1* | 3/2006 | Glas | 474/8 |
| 2006/0058143 A1* | 3/2006 | Rickling et al. | 474/215 |
| 2006/0248475 A1* | 11/2006 | Abrahamsson | G06F 3/0482 715/835 |
| 2007/0070090 A1* | 3/2007 | Debettencourt | G01C 21/3664 345/672 |
| 2007/0260398 A1* | 11/2007 | Stelpstra | G01C 21/00 701/469 |
| 2008/0091349 A1* | 4/2008 | Liu | G09B 29/106 701/457 |
| 2008/0113839 A1* | 5/2008 | Nozaki et al. | 475/31 |
| 2008/0204476 A1* | 8/2008 | Montague | G06F 3/04845 345/661 |
| 2009/0303251 A1* | 12/2009 | Balogh | G06F 17/30241 345/632 |
| 2010/0031186 A1* | 2/2010 | Tseng | G06F 1/1624 715/786 |
| 2010/0063694 A1* | 3/2010 | Lee et al. | 701/54 |
| 2010/0138153 A1 | 6/2010 | Abe et al. | |
| 2010/0292924 A1 | 11/2010 | Kato | |
| 2011/0087397 A1* | 4/2011 | Iraha et al. | 701/29 |
| 2011/0202527 A1* | 8/2011 | McCloskey | G06F 17/30825 707/728 |
| 2011/0302527 A1* | 12/2011 | Chen | G06F 3/0488 715/800 |
| 2012/0066640 A1* | 3/2012 | Kwak | G06F 9/4443 715/788 |
| 2012/0242581 A1* | 9/2012 | Laubach | G06F 3/04812 345/168 |
| 2012/0254804 A1* | 10/2012 | Sheha | G06Q 30/02 715/834 |
| 2012/0266068 A1* | 10/2012 | Ryman | G06F 3/0485 715/719 |
| 2012/0316772 A1* | 12/2012 | Han | G01C 21/3492 701/414 |
| 2013/0080008 A1* | 3/2013 | Tanaka et al. | 701/62 |
| 2013/0257742 A1* | 10/2013 | Jones | G09G 5/34 345/173 |
| 2013/0273968 A1* | 10/2013 | Rhoads | G06F 17/30244 455/556.1 |
| 2013/0321402 A1* | 12/2013 | Moore | G01C 21/3611 345/419 |
| 2013/0328915 A1* | 12/2013 | Arikan | G06T 11/20 345/619 |
| 2014/0025269 A1* | 1/2014 | Ayabe et al. | 701/60 |

* cited by examiner

SYSTEM AND METHOD FOR NAVIGATION WITH INERTIAL CHARACTERISTICS

This application claims benefit of priority to U.S. Provisional Application Ser. No. 61/655,853, entitled "System And Method For Navigation With Inertial Characteristics," filed Jun. 5, 2012.

BACKGROUND

1. Technical Field

This disclosure relates generally to navigation, and, more specifically, to functionality of devices providing route navigation.

2. Description of the Related Art

Navigation capability can be found in a number of electronic devices including personal navigation devices, such as handheld Global Positioning System (GPS) Devices, as well as mobile phones that have GPS functionality. One common use for navigation-enabled devices includes navigating from an origination to a destination. For instance, a user may input a destination street address to the device, and the device may generate a suggested route that the user should travel from the user's current destination to arrive at the destination address. Generally, as the user travels the route, the device may graphically and/or audibly specify directional changes along the route, such as "turn right on Smith St. in 100 yards." As the aforesaid navigation features are typically used on the go, screen "real estate" is typically less than that of a full-sized computer or other large-screened device. In many cases, a user may be viewing a navigation route on a much smaller screen of a portable device, such as a smartphone.

SUMMARY OF EMBODIMENTS

The present disclosure describes embodiments of a system and method for navigation with inertial characteristics. Embodiments may include a navigation component configured to generate a map display including a map and a position indicator representing a location of a user on the map. For example, the position of a user may be displayed on a map of a geographic region. The user's position may be updated over time as the user travels from one location to another. In some cases, the display may include a route to help the user navigate from an origination to a destination. The user's position indicator may be positioned in a first position relative to the map display (e.g., bottom-center).

The navigation component may be configured to detect that the user is turning in a direction of travel (e.g., to the left, or to the right), and, responsive to that detection, shift the position indicator within the map display in the opposite direction. The shifting may cause additional map information to be displayed in the direction of travel. For instance, for an example scenario in which the position indicator is positioned at bottom-center of the map display, the position indicator may be moved left when a right turn is detected (and vice versa). In some cases, this shifting may emulate an inertial force. For instance, as the turn is performed, the position indicator and the map may shift in the opposite direction of the turn, thus mimicking a centrifugal force applied to the display content. Additionally, the map information may be updated based on this new display position of the position indicator. In this way, in the time period surrounding a turn, embodiments may display more useful information to the user (e.g., map information pertaining to the user's new direction of travel) while omitting impertinent information (e.g., map information that doesn't pertain to the user's new direction of travel). Upon completion of the turn, the map information and position indicator may be shifted back to their pre-turn locations. For instance, if the position indicator were fixed at a center-bottom position of the display pre-turn, the graphical indicator may be returned to that location post-turn.

Figure 1A:
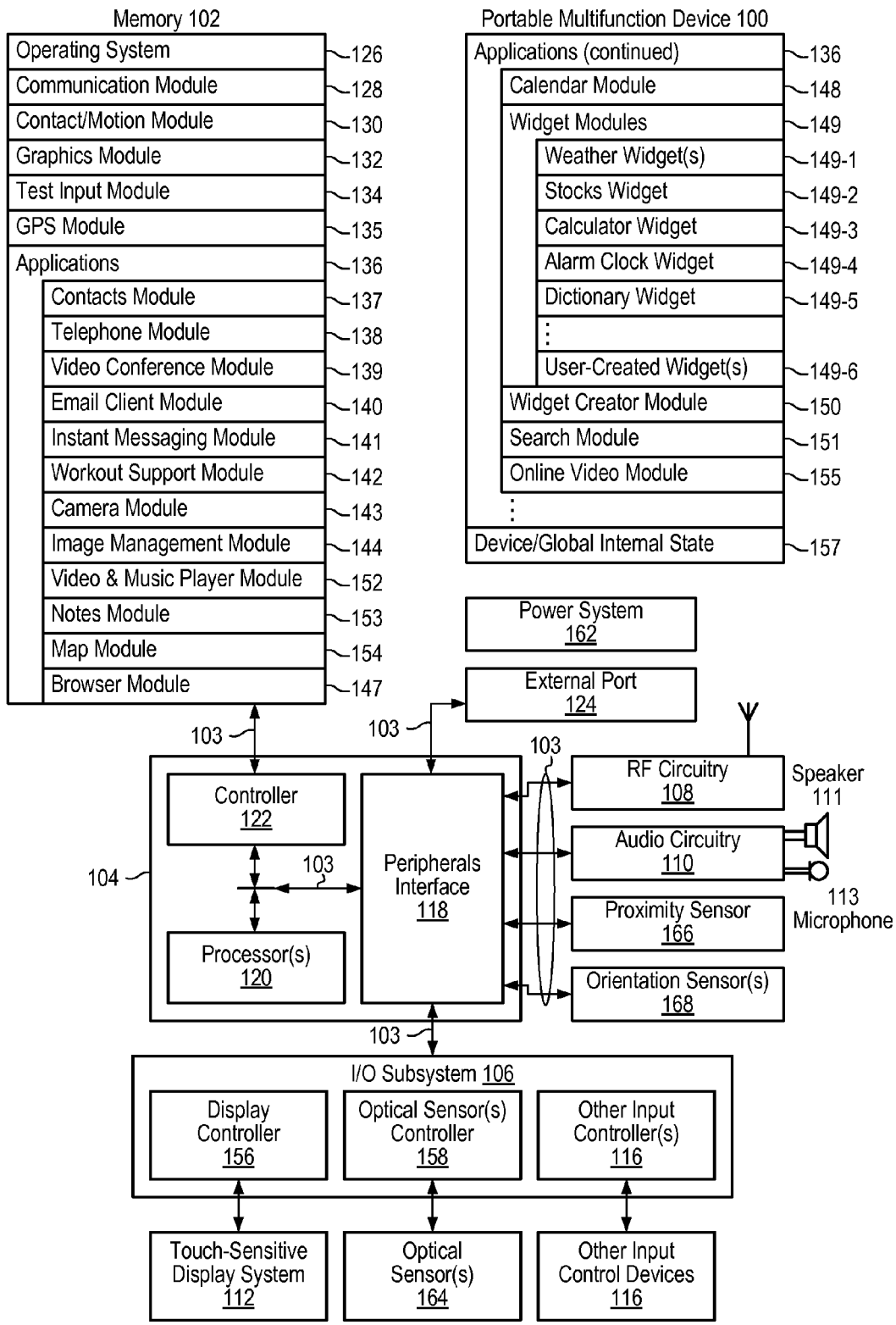
FIG. 1A illustrates a block diagram illustrating a portable multifunction device with a touch-sensitive display in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for navigation with inertial characteristics are described. In various embodiments, the navigation capability described herein may be implemented as part of a multifunction device, including but not limited to mobile phones that have GPS functionality, tablet computing devices, and personal navigation devices. A user of the multifunction device may interact with a mapping application capable of displaying a user's location on a map. For instance, a user may rely on the multifunction device to navigate from an origination to a destination. In one example, the user may input a destination street address to the device, and the device may generate a suggested route that the user should travel from the user's current destination to arrive at the destination address. Generally, as the user travels the route, the multifunction device may graphically and/or audibly specify directional changes along the route, such as a graphical and/or audible indication to "turn right on Smith St. in 100 yards." As the aforesaid navigation features are typically used on the road, screen "real estate" may in some cases be limited. For instance, instead of a full sized computer monitor, a user might be viewing a map and/or navigation route on a much smaller screen of a portable device, such as a smartphone.

Various embodiments described herein enable a user to see what lies ahead, even on devices with limited screen real estate (e.g., portable devices). For instance, if a user is performing a turn in a vehicle, embodiments may detect and/or anticipate this turn in order to alter the navigation display of the multifunction device to convey additional map information that is pertinent to the user's new direction of travel. For instance, embodiments may include a navigation-enabled device that displays a portion of a map; the map may also include a graphical position indicator to visually indicate a user's position on the map. This position indicator may also have its own position relative to the map display. For instance, the position indicator in some cases may be located at the bottom of the display vertically and centered on the display horizontally. In this example, the position indicator may generally (but not necessarily always) stay fixed relative to the map display, and the map may be shifted (e.g., panned) and rotated (e.g., turned) as the user's position changes on the map. Embodiments may detect when a user is (or is about to) turn in a specific direction of travel. In various embodiments, the granularity of this detection can be fine (e.g., direction specified by GPS coordinates) or coarse (e.g., direction specified as left or right). In response to detecting the turn, embodiments may shift the position indicator on the screen in the opposite direction of the turn. For instance, in the example above where the position indicator is positioned at bottom center of the map display, the position indicator may be moved left when a right turn is detected (and vice versa). In some cases, this shifting may emulate an inertial force. For instance, as the turn is performed, the position indicator and the map may shift in the opposite direction of the turn, thus mimicking a centrifugal force applied to the display content. Additionally, the map information may be updated based on this new display position of the position indicator. In this way, in the time period surrounding a turn, embodiments may display more useful information to the user (e.g., map information pertaining to the user's new direction of travel) while omitting impertinent information (e.g., map information that doesn't pertain to the user's new direction of travel). Upon completion of the turn, the map information and position indicator may be shifted back to their pre-turn locations. For instance, if the position indicator were fixed at a center-bottom position of the display pre-turn, the graphical indicator may be returned to that location post-turn.

Multifunction Device

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
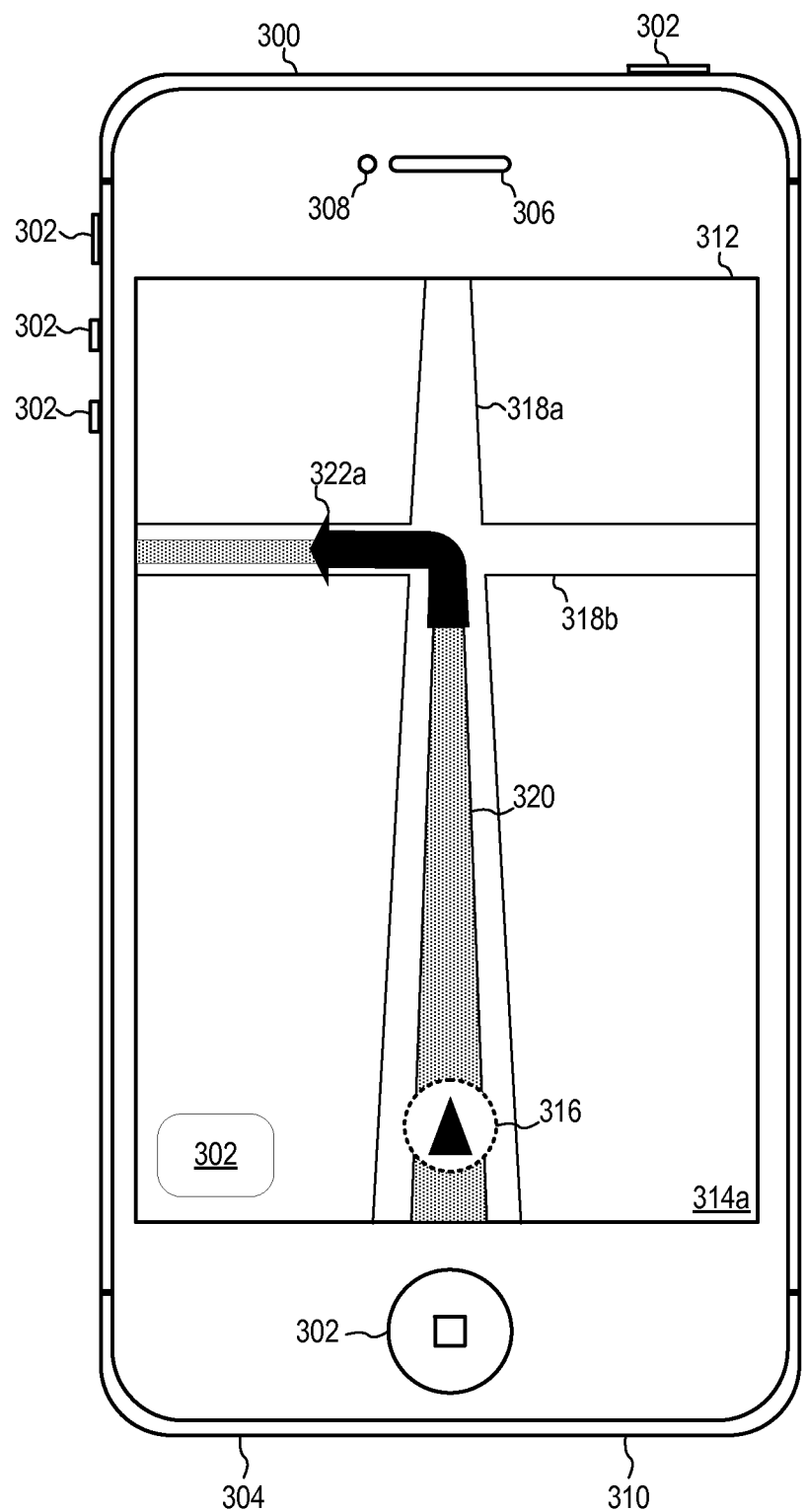
FIGS. 3-7 illustrate a multifunction device implementing navigation with inertial characteristics in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or set of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player module and a music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of
  contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
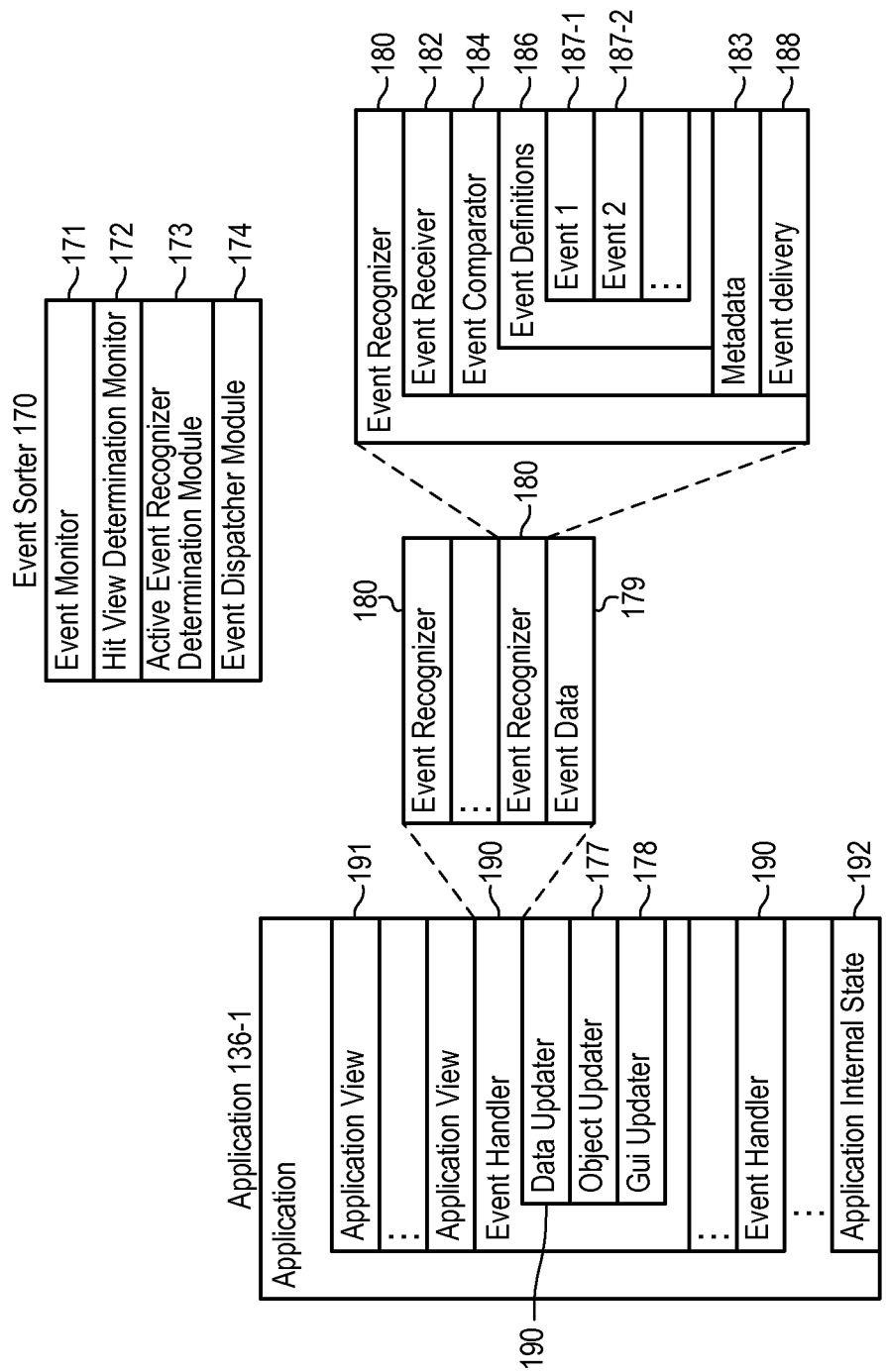
FIG. 1B illustrates a block diagram illustrating example components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch sensitive display 112, as part of a multi-touch gesture). Peripherals interface 118 transmits information it receives from I/O subsystem 106 or a sensor, such as proximity sensor 166, orientation sensor(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
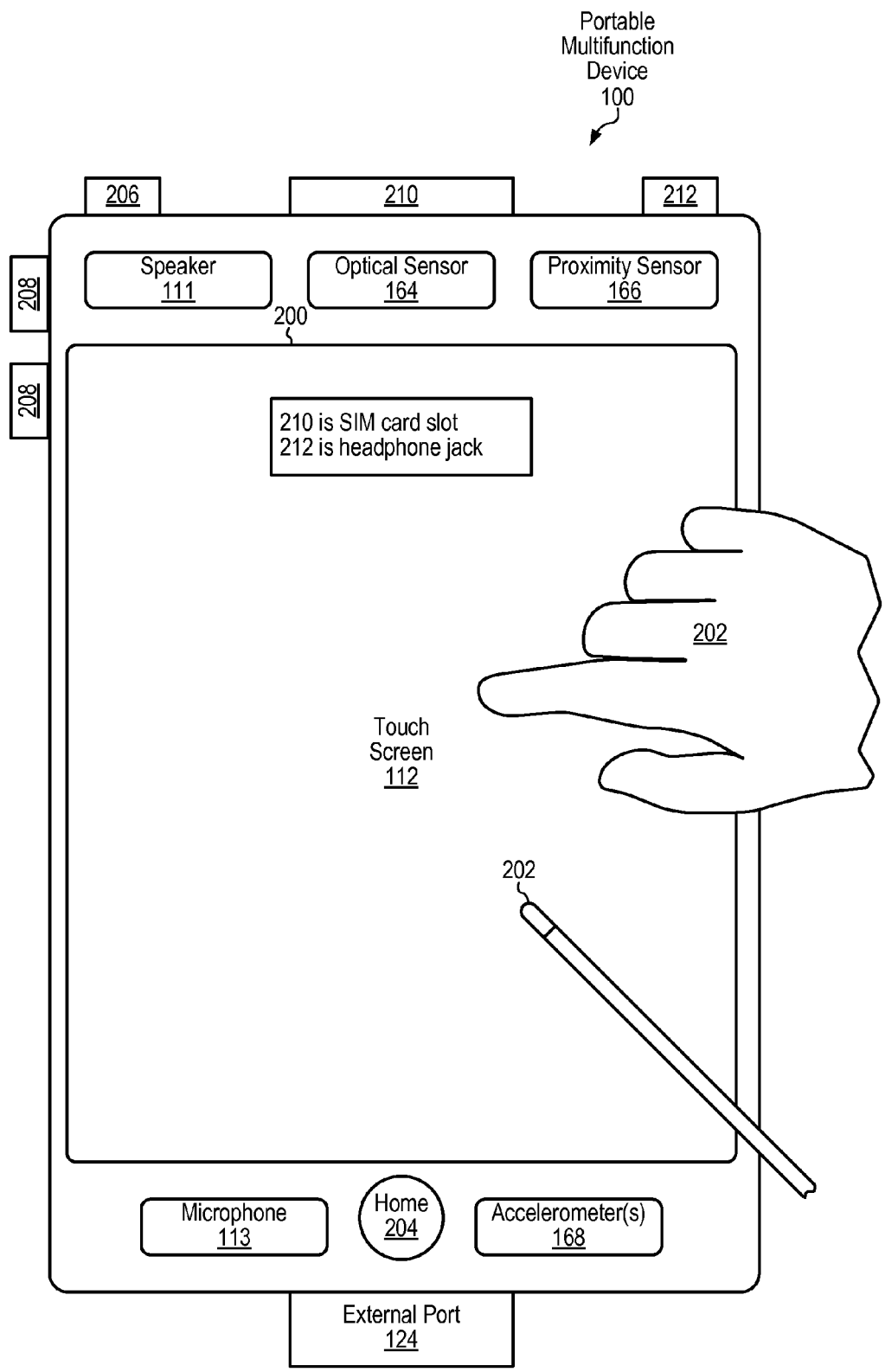
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to inputs on touch screen 112 (where the touch sensitive surface and the display are combined), a touch-sensitive surface that is separate from the display may be used instead of touch screen 112.

Mapping Functionality

FIG. 3 illustrates another example of a multifunction device, which may be configured in a manner similar to the multifunction device described above. In the illustrated embodiment, a multifunction device 300 includes a mapping application (e.g., map module 154 described above) that may be stored in one or more memories of multifunction device 300 and executed on one or more processors of multifunction device 300. As is the case for the multifunction device described above, multifunction device 300 may include one or more controls 302 for operating the multifunction device. These controls may include but are not limited to power controls for turning the device on and off, volume controls for adjusting the ear piece volume or the speaker volume, menu controls for navigation functions of the device, and function controls for initiating one or more function or actions on the device. Controls 302 may include hardware controls or software controls. For instance, the bottom left corner of electronic display 312 includes a graphical representation of a control 312 that may be selected by a user, such as by way of touch in accordance with the touch screen functionality described above. Multifunction device 300 may also include other components similar to those described above, such as a microphone 304, an earpiece 306 (e.g., a speaker through which to convey audio representations of telephone calls), an optical sensor 308, and/or a speaker 310. Each of these components may be configured in a similar manner to those like-named components of FIG. 2 described above. Furthermore, electronic display 312 may be configured with touch screen capability, such as touch screen 112 described above.

As noted above, multifunction device 300 includes a mapping application that may be stored in one or more memories of multifunction device 300 and executed on one or more processors of multifunction device 300. In the illustrated embodiment, the graphical representation of the mapping application may include a map instance 314a of a geographic region. This map may be presented as a two-dimensional map or a three-dimensional map, the selection of which may be specified through, e.g., a user-configurable parameter of the mapping application. Map instance 314a may include a graphical position indicator 316, which may represent the location of the multifunction device within the geographic region of the map. Generally position indicator 316 may represent the current or real-time position of the multifunction device, although it should be understood that in some cases there may exist some small amount of temporal latency between the actual position of the multifunction device and the graphical representation of that location (e.g., position indicator 316). This may occur, e.g., when the multifunction device is in motion.

Furthermore, multifunction device 300 may generally be operated by a user. For example, multifunction device 300 may in some cases be a smartphone utilized by an individual to make phone calls, send text messages, browse the internet, etc. As use of multifunction device by an individual generally implies the individual is proximate to the multifunction device (e.g., the user may be holding the device in his or her hand), references herein to the location of the device and the location of the user may be considered to be synonymous. However, it should be understood that in some cases the actual position of the multifunction device and the user of that device may differ by some distance. For instance, the user may place his or her multifunction device on a table of an outdoor café while sitting in a nearby chair. In this case, the position of the device and the position of the user may differ by some small amount. In another example, multifunction device 300 may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the multifunction device and the position of the multifunction device user may be considered to coincide.

In various embodiments, the map instance 314a displayed by the multifunction device may include one or more roads (e.g., roads 318a-b), buildings (not illustrated), terrain features (e.g., hills, mountains) (not illustrated), parks (not illustrated), water bodies (not illustrated), and/or any other item that may be conveyed by a map. In some cases, the map may also include other map or navigation information including but limited to readouts from one or more of a directional compass, an altimeter, and/or a thermometer.

In various embodiments, the mapping application may be configured to generate directions from an origination (e.g., an address or a user's current position) to a destination (e.g., an address, landmark, or point of interest). For instance, an indication of the origination and/or destination may be input into the multi function device by the user. The multifunction device may generate one or more candidate routes between those two points. The multifunction device may select one of those routes for display on the device. In other cases, multiple candidate routes may be presented to the user and the user may select a preferred route. In the illustrated embodiment, one route is illustrated as route 320. The route may also include turn-by-turn directions which may be presented to the user, such as a graphical indication to perform a turn 322a from road 318a to road 318b. In some embodiments, this graphical indication to perform a turn may be supplemented or substituted with an audible indication to turn, such as a voice command from speaker 310 that indicates the user is to "turn left in 100 yards," for example.

In various embodiments, the mapping application of the multifunction device may be configured to track the position of the user over time and correspondingly adjust the graphical position indicator 316 to indicate the new position. For instance, the mapping application may determine that the user is traveling along route 320 from position information (e.g., information from GPS module 135) and update the map instance 314a accordingly. For instance, in some cases the map instance 314a may remain stationary while position indicator 316 is moved along the route. In other cases, position indicator 316 may remain stationary or "fixed" while map instance 314a is moved (e.g., panned, turned, etc.) around the position indicator.

In other embodiments, the mapping application may be configured to perform other functions including but not limited to geocaching, creating or interpreting waypoints, searching for and displaying points of interest (POIs) (e.g., gas stations, banks, grocery stores, etc.), displaying traffic information, and/or any other functionality useful for navigation.

Further note that the positioning capability of the multifunction device and the mapping application need not be limited to any particular type of transportation. The techniques described herein may be well-suited for all kinds of transportation including but not limited to walking, cycling, driving, or utilizing public transportation.

Mapping Application—Inertial Characteristics

As described above, embodiments may detect when a user is (or is about to) turn in a specific direction of travel. In various embodiments, the granularity of this detection can be fine (e.g., direction specified by GPS coordinates) or coarse (e.g., direction specified as left or right). In response to detecting the turn, embodiments may shift the position indicator on the screen in the opposite direction of the turn. In some cases, this shifting may emulate an inertial force. For instance, as the turn is performed, the position indicator and the map may shift in the opposite direction of the turn, thus mimicking a centrifugal force applied to the display content. Additionally, the map information may be updated based on this new display position of the position indicator. For example, the displayed map information may be shifted commensurate with the shift applied to the position indicator. In this way, in the time period surrounding a turn, embodiments may display more useful information to the user (e.g., map information pertaining to the user's new direction of travel) while omitting impertinent information (e.g., map information that doesn't pertain to the user's new direction of travel). Upon completion of the turn, the map information and position indicator may be shifted back to their pre-turn locations. FIGS. 4-7 illustrate examples of the inertial characteristics described herein, within the context of a mapping application similar to that of FIG. 3. Any of the functionality described herein may be implemented by the mapping application (e.g., map module 154). For the purposes of this description, FIG. 3 may be considered to be time t=0 for route navigation. Subsequent figures may represent later instances during route navigation (e.g., t=0, t=1, t=2, t=n, where 0<1<2< . . . <n). Also note that like-numbered elements of FIGS. 3-7 may be considered to equivalent. Description of a numbered element in one Figure also applies to like numbered elements in other Figures. As one example, the description of route 320 with respect to FIG. 3 also applies to route 320 of FIGS. 4-7. Furthermore, map instances 314a-314e may be referenced herein as distinct maps, although it should be understood that at least some of the map information of these map instances may overlap. In general, map instances 314a-314e represent different portions of the same geographic region.

As described above, FIG. 3 includes a navigation route 320 that may include one or more changes in direction, such as turn 322a, along the way to a destination. Additionally, graphical position indicator 316 may specify a current location of the user (and multifunction device 300) within map instance 314a and along route 320. In map instance 314a, the user is traveling route 320 but has not yet begun performing turn 322a. Furthermore, navigation in the illustrated embodiment may be presented in a "course up" configuration where the direction of travel is aligned along the center vertical axis of display 312.

Figure 4:
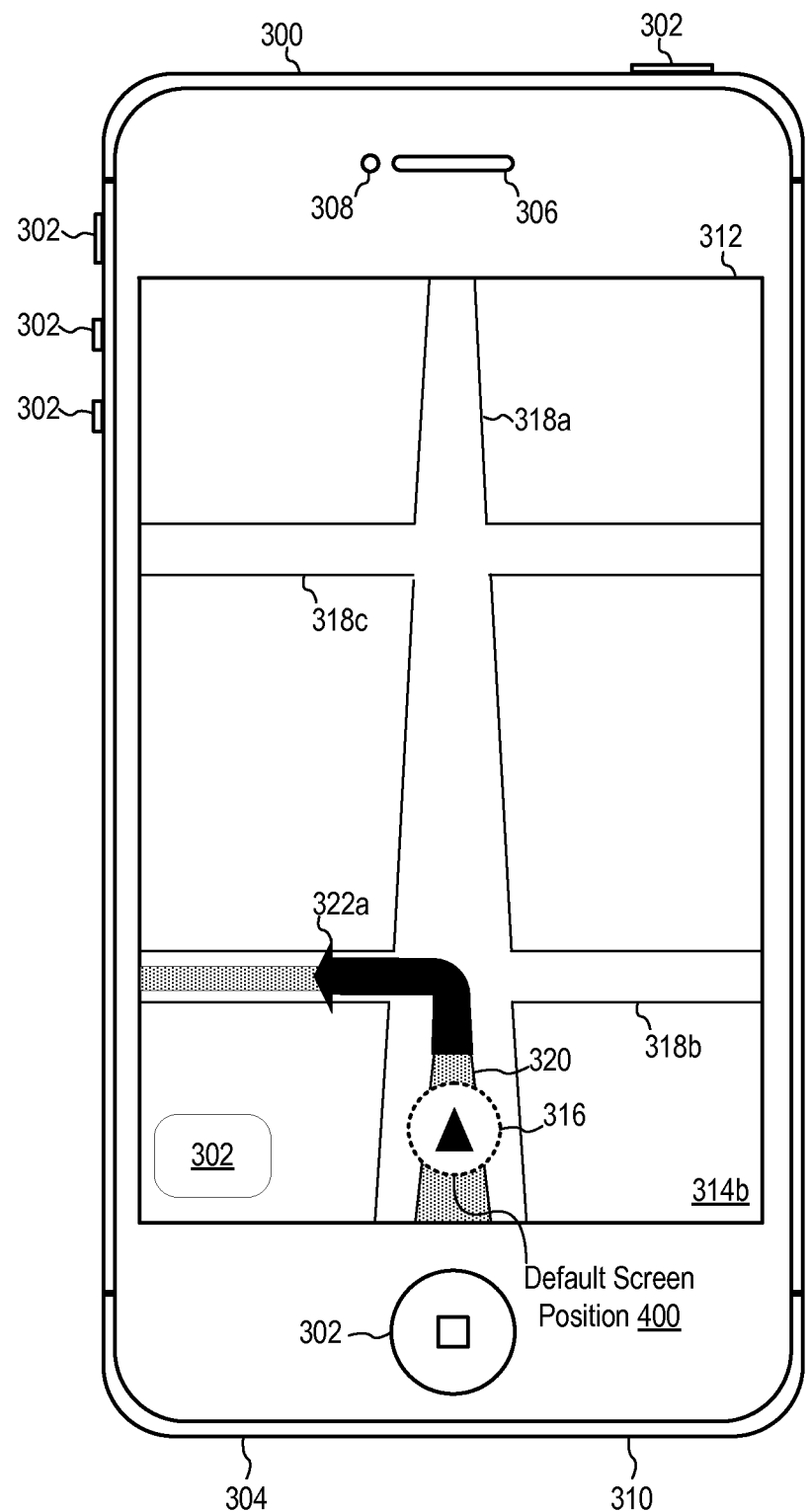

In FIG. 4, map instance 314a has been updated to map instance 314b to represent navigation at a time t=1. In the illustrated embodiment, the user has approached but has not begun performing turn 322a. (The mapping application may be configured to determine whether the user is turning according to techniques described in more detail below.) Map 314b does illustrate that the user has traveled further along route 320. For instance, during the transition from map 314a to map 314b, position indicator 316 may be held in a fixed position (e.g., at default position 400) while the graphical map information is shifted (e.g., panned) and/or rotated (e.g., turned). Generally position indicator 316 may be considered to be "fixed" at default position 400; although as described in more detail below, this need not be the case in all instances. In various embodiments, an inertial or centrifugal force may be virtually mimicked within the mapping application to strategically shift the position indicator at times that may be helpful to the user (e.g., during turns, as described in more detail below). Also note that the location of position indicator may be specified in two forms. First, the position indicator has a position relative to display 312. For instance, in FIG. 4, position indicator 316 is located at bottom-center of display 312. For example, the location of position indicator 316 on display 312 could be referenced by a x-y coordinate system applied to display 312. This coordinate system may be independent of any map information that is actually displayed on display 312. Second, the position indicator has a position within the geographic region conveyed by the map instances described herein. For instance, the map instances may display a portion of the world (e.g., planet Earth), and the position indicator may represent coordinates within that portion of the world (e.g., GPS coordinates). When considering the techniques described below, it should be noted that shifting the position of position indicator 316 within display 312 does not necessarily indicate that the user's position has changed. For instance, if the position indicator and the graphical map information are shifted together in a common direction, the portion of the map information display may change without any change in the user's actual position. Likewise, the user's position may change while the position indicator remains fixed at default position 400. In this case, the map information may be panned and/or rotated to indicate a change in user position without actually moving the location of the position indicator "on screen" (e.g., on display 312).

Furthermore, in regard to FIG. 4, map instance 314b illustrates a portion of a geographic region in which the user is traveling. At the time of map instance 314b, the user is traveling along road 318a toward intersecting road 318b (and road 318c). Subsequent Figures display different map information responsive to the user's travel along route 320.

Figure 5:
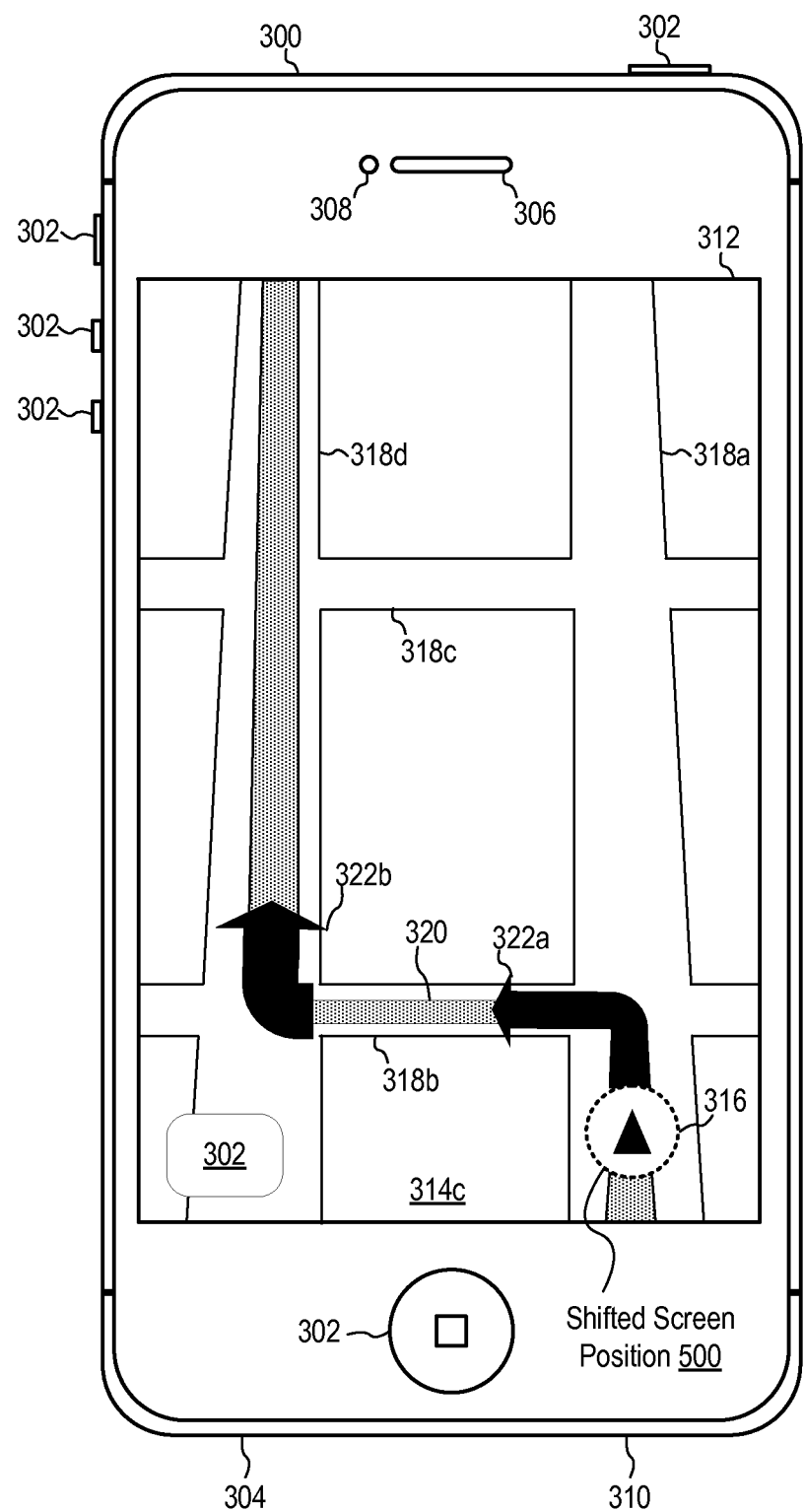

In FIG. 5 (time t=2), the user has moved further along route 320 and has begun performing turn 322a from road 318a to road 318b. The mapping application may be configured to detect that the user is turning in a specific direction of travel (e.g., turning to the left, coinciding with road 318b). In response to this detection, the mapping application may shift the position indicator within the map display in a direction opposite to this direction of travel. For instance, as illustrated by shifted position 500, in the illustrated embodiment position indicator 316 has been moved to the right, opposite to the direction of travel into which the user is turning (left in this instance). It should be noted that in various embodiments shifting the position indicator 316 to a new location (as is the case in FIG. 5) may automatically shift the surrounding map information in unison with the position indicator. In various embodiments, this shift may be initiated just before the turn, at the beginning of the detected turn, or after some configurable portion (e.g., 10%) of the turn has been completed. For instance, the mapping application may predict that the turn is forthcoming based on determining that the user is proximate to the next turn in the route. In other cases, the mapping application may detect the turn is occurring based on trends in position data from a positioning component (e.g., GPS module 135) and/or based on input from one or more orientations sensors (e.g., one or more of orientation sensor(s) 168).

By moving the position indicator in the opposite direction (e.g., opposite to the direction into which the user is turning or expected to turn), the mapping application may provide additional mapping information to be displayed in the user's new direction of travel. Generally, this information may be more helpful to the user as it includes more information about the user's forthcoming route than would otherwise be displayed during the time period surround the turn (e.g., before or during the turn). Receiving this additional map information at this time may be helpful to the user as it enables the user to anticipate what lies ahead after the turn. For instance, consider map instance 314c of FIG. 5, as a result of position indicator 316 being shifted to the right, the user may now see that a right turn 322b onto road 318d quickly follows the current left turn 322a. For example, in contrast to map instance 314c, map instance 314b of FIG. 4 does not afford the user with the ability to view the next turn in the route. When viewing map instance 314c, the user may, e.g., see that turn 322b quickly succeeds turn 322a. This may enable the user to, e.g., anticipate the need to turn into the right most lane of road 318b in preparation for turn 322b.

In certain cases, such as when display 312 is limited in size, the ability to shift the position indicator and map information automatically in response to a turn may increase the amount of useful information at the user's disposal. For instance, if the user is turning left, map information to the user's right is likely not as useful as information to the user's left. By shifting the position indicator to the right in this case, the user may be presented with more map information for the direction into which the user is turning (left in this example).

Figure 6:
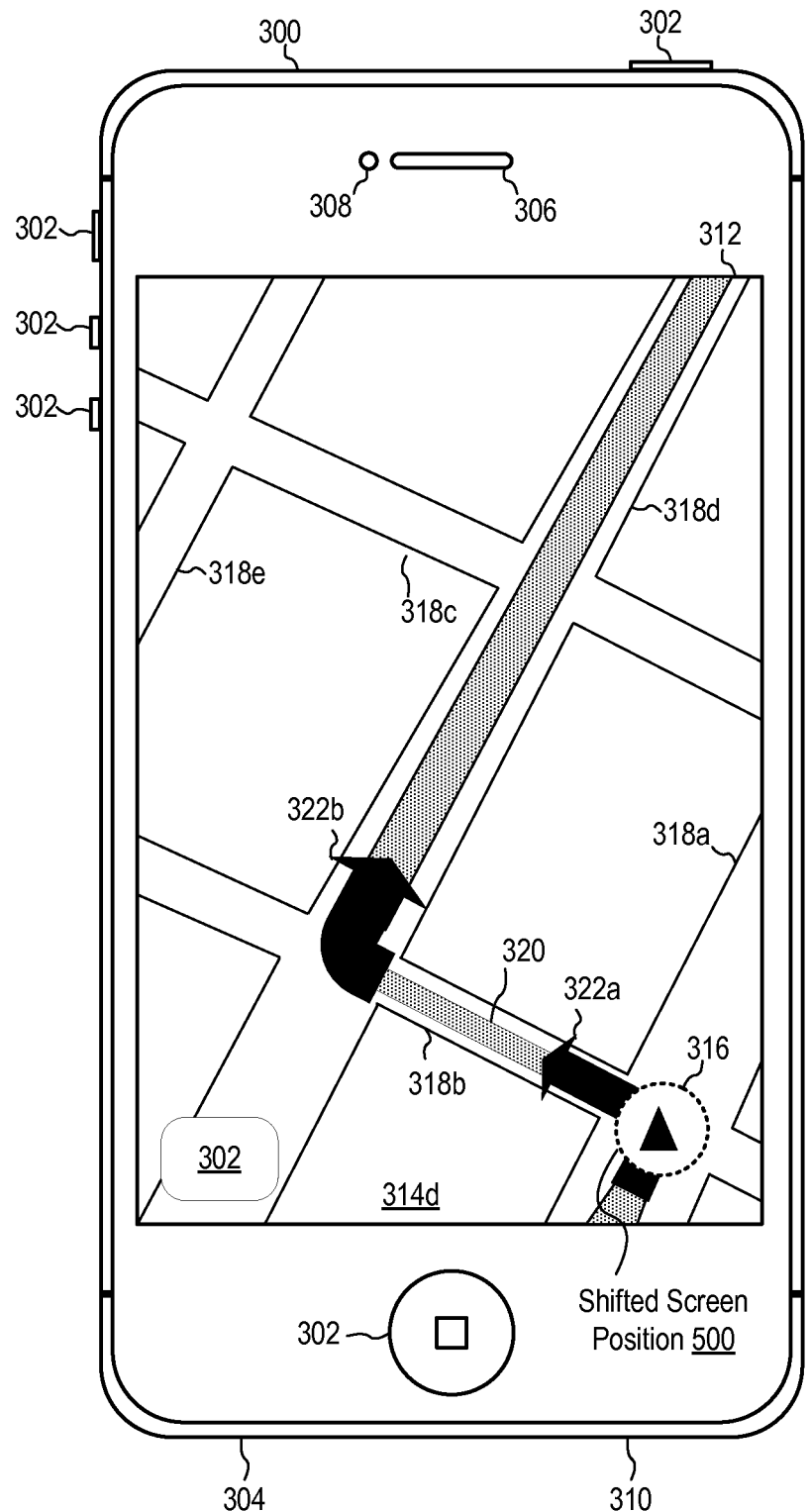
Figure 7:
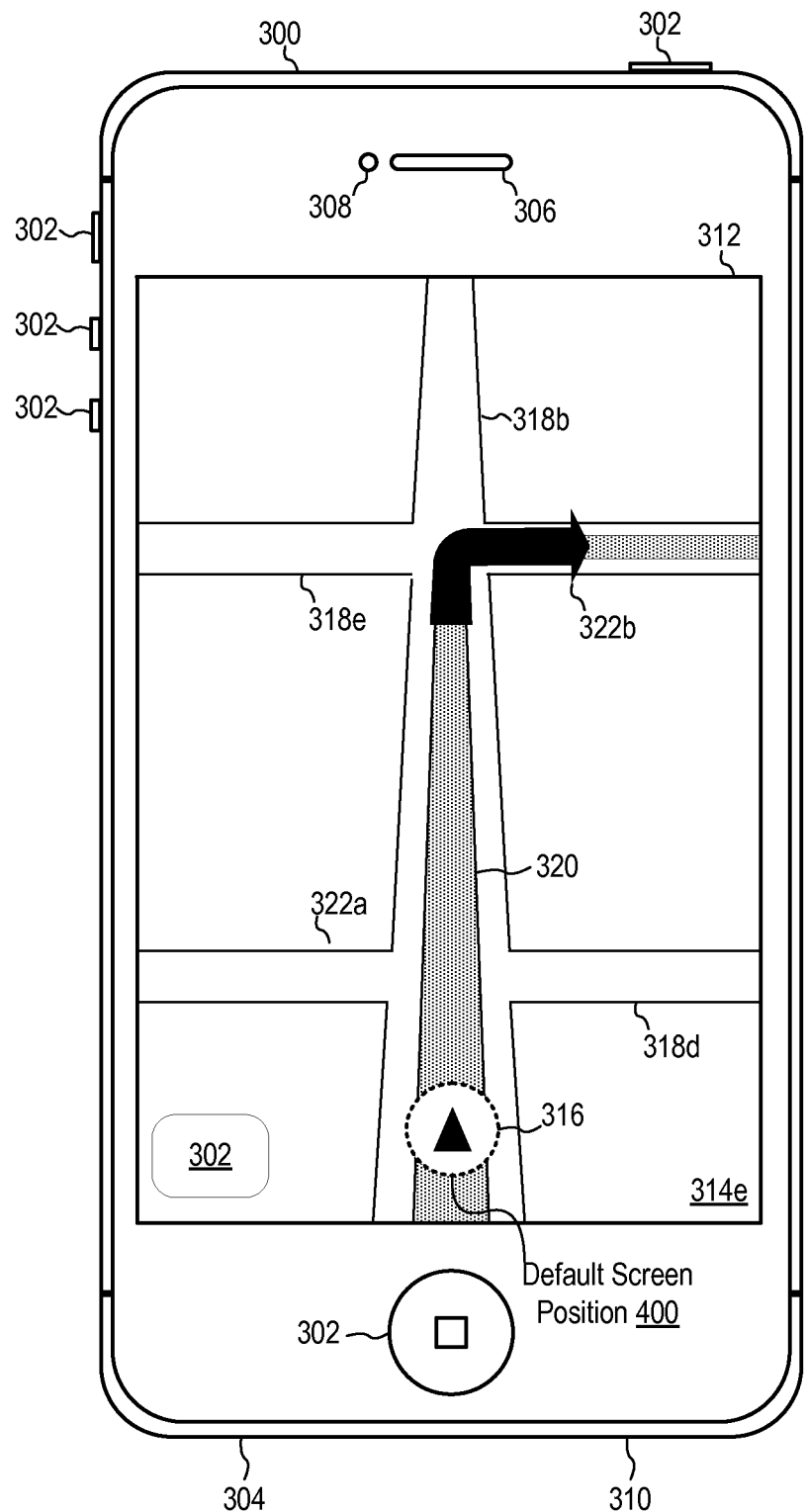

FIG. 6 (time t=3) includes a view of the map display while the user is performing turn 322a; this view is illustrated as map instance 314d. In map instance 314d, position indicator 316 remains in shifted position 500. As the user is turning, the map information is rotated around position indicator 316, which is temporarily fixed in shifted position 316. This shift exposes additional map information including road 318e. In the illustrated map instance 314d, the user continues to receive pertinent map information while the map view rotates in accordance with the current navigation view (e.g., "course up"). FIG. 7 (time t=4) includes a view of the map display after turn 322a is completed; this view is illustrated as map instance 314e. In map instance 314e, position indicator 316 has been returned to default position 400. As in previous cases, shifting the position indicator 316 to a new location may automatically shift the surrounding map information in unison with the position indicator.

Example Methods

Figure 8:
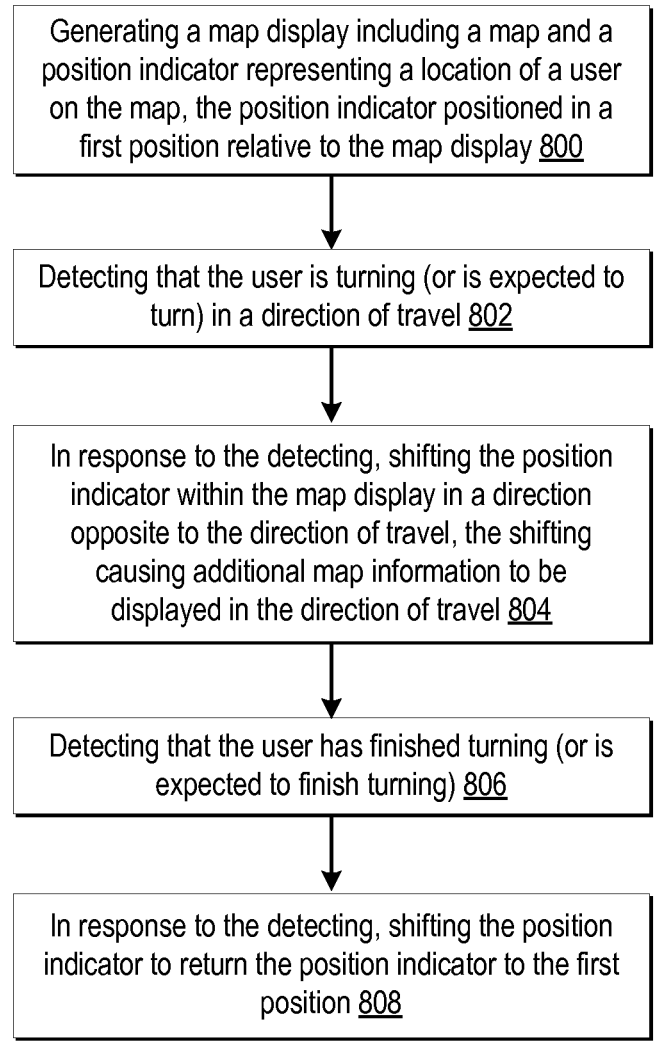
FIG. 8 illustrates a flowchart of an example method for implementing navigation with inertial characteristics in accordance with some embodiments.

Various embodiments of the system and method for navigation with inertial characteristics may include methods, which may be performed on one ore more computers, such as that of FIG. 9 below, or electronic devices, such as the multifunction devices described above. FIG. 8 illustrates one example of such a method. As illustrated at block 800, the method may include generating a map display including a map and a position indicator representing the location of a user on the map. One example of such a map may include any of the map instances described above (e.g., maps instances 314a-e). Furthermore, an example of the position indicator includes position indicator 316 described above. In various embodiments of the method, the method may include positioning the position indicator in a first position relative to the map display. For instance, as described above, the position indicator may generally (but not necessarily always) stay fixed relative to the map display, and the map may be shifted (e.g., panned) and rotated (e.g., turned) as the user's position changes on the map.

As illustrated at block 802, the method may also include detecting that the user is turning (or is expected to turn) in a direction of travel. For instance, the mapping application may predict that the turn is forthcoming based on determining that the user is proximate to the next turn in the route. In various embodiments, the method may include receiving multiple position updates specifying the user's position at different points in time (e.g., from GPS module 135 and/or orientation sensors 168). The method may also include evaluating the position updates to detect a trend in the user's position in order to determine that the user is turning in a particular direction of travel (e.g., positions trending right or left). In some cases, this evaluation may be performed quickly during the initial part of a turn (e.g., such that the time to perform the evaluation is imperceptible to the user). In some embodiments, the method may include evaluating a navigation route to determine that the user is about to turn. For instance, the method may include determining the user's position on the navigation route and identifying the next turn to be encountered by the user on that route.

As illustrated at block 804, the method may include, in response to detecting that the user is turning or expected to turn in the specific direction of travel, shifting the position indicator in a direction opposite to that direction of travel such that additional map information is displayed in that direction of travel. In some cases, this shifting may emulate an inertial force. For instance, as the turn is performed, the method may include shifting the position indicator and the map in the opposite direction of the turn, thus mimicking a centrifugal force applied to the display content. Additionally, the method may include updating the map information based on this new display position of the position indicator. For example, the displayed map information may be shifted commensurate with the shift applied to the position indicator. In this way, in the time period surrounding a turn, the method may include displaying more useful information to the user (e.g., map information pertaining to the user's new direction of travel) while omitting impertinent information (e.g., map information that doesn't pertain to the user's new direction of travel). One non-limiting example of shifting the position indicator is described above with respect to shifting the position indicator from default position 400 to shifted position 500.

In various embodiments, the method may also include detecting the user has finished turning or is expected to finish turning, as illustrated at block 806. For instance, this portion of the method may use techniques similar to those described above with respect to detecting the beginning of the turn (e.g., trend detection in position updates and/or route analysis). As illustrated at block 808, the method may also include, in response to detecting the turn has ended (or is expected to end), shifting the position indicator to return the position indicator to the first position. One non-limiting example of shifting the position indicator is described above with respect to shifting the position indicator from default position 400 to shifted position 500.

Example Computer System

Various embodiments of the system and method for navigation with inertial characteristics, as described herein, may be executed on one or more computer systems, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement a mapping application 924 incorporating any of the functionality described above. Additionally, data 932 of memory 920 may include mapping information 934 including any of the information or data structures described above, including but not limited to mapping information for rendering map instances, position information indicating past or current positions of the user, and/or route information for navigating from an origination to a destination. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 9:
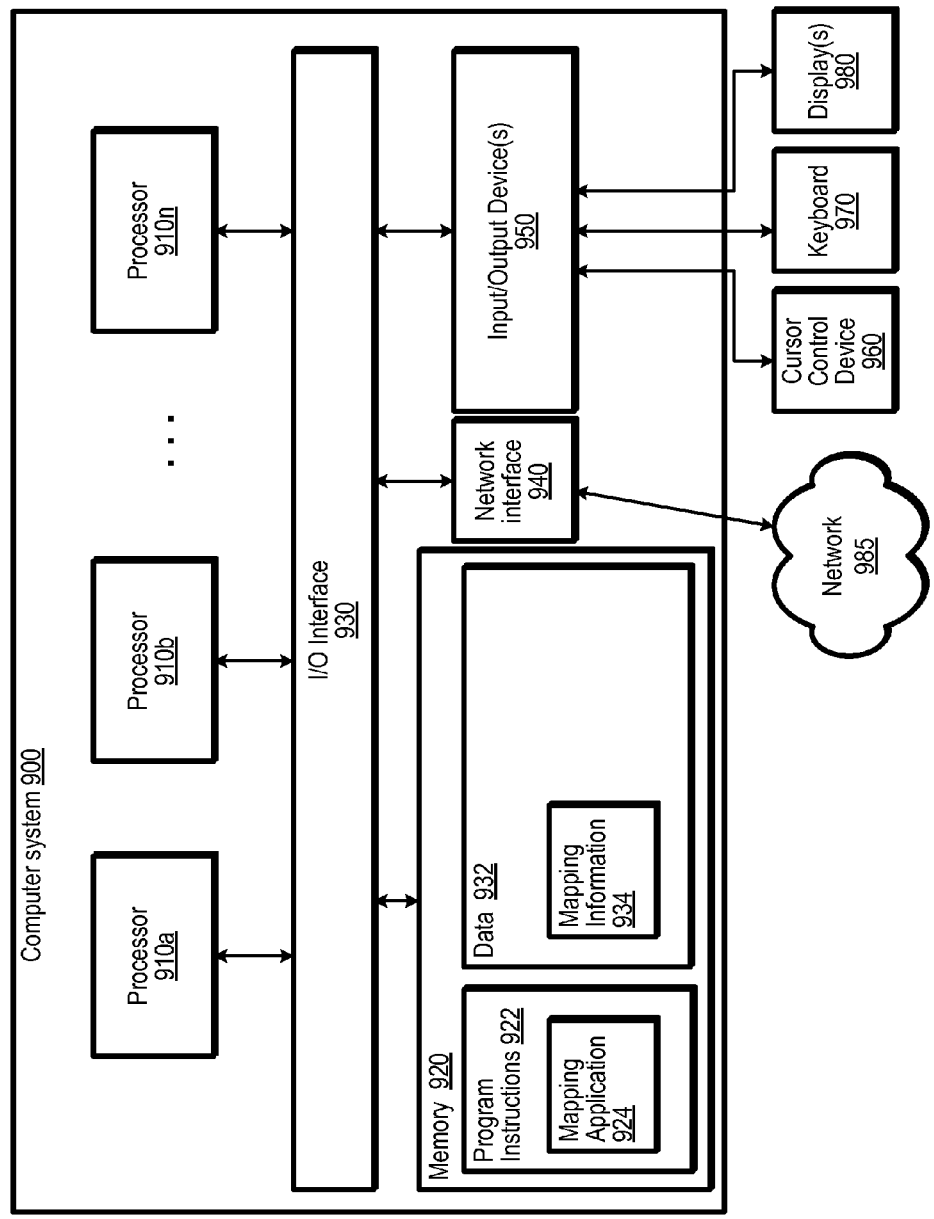
FIG. 9 illustrates an example computer system configured to implement aspects of the system and method for navigation with inertial characteristics.

As shown in FIG. 9, memory 920 may include program instructions 922, which may be processor-executable to implement any element or action described above. In one embodiment, the program instructions may implement the methods described above, such as the methods illustrated by FIG. 8. In other embodiments, different elements and data may be included. Note that data 932 may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Map Service Operating Environment

Figure 10:
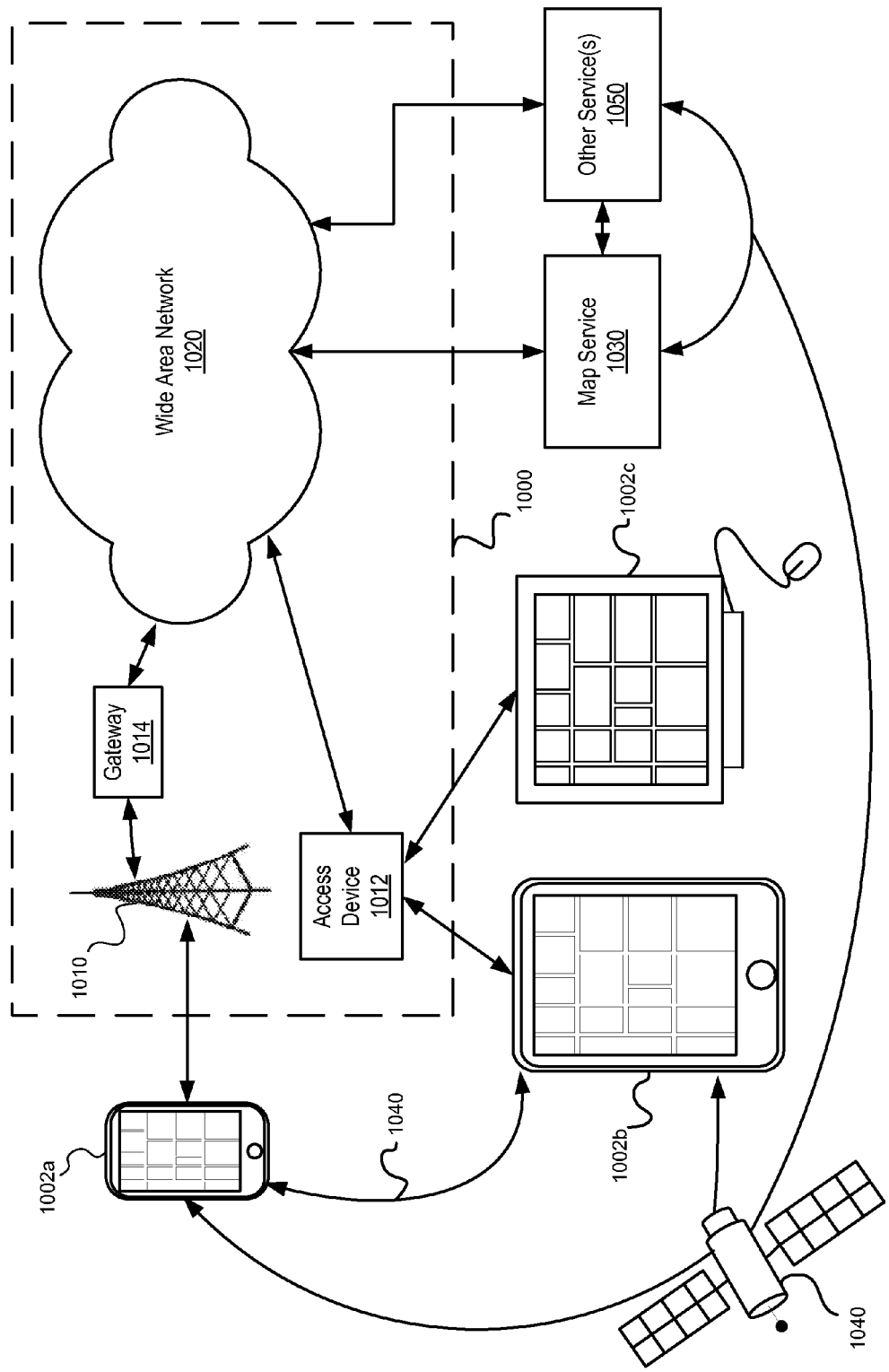
FIG. 10 illustrates an example map service operating environment configured to implement aspects of the system and method for navigation with inertial characteristics.

Various embodiments may operate within a map service operating environment. FIG. 10 illustrates a map service operating environment, according to some embodiments. A map service 1030 may provide map services for one or more client devices 1002*a*-1002*c* in communication with the map service 1030 through various communication methods and protocols. A map service 1030 generally may provide services, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). Client devices 1002*a*-1002*c* may utilize these map services by obtaining map service data. Client devices 1002*a*-1002*c* may implement various techniques to process map service data. Client devices 1002*a*-1002*c* may then provide map services to various entities, including, but not limited to, users, internal software or hardware modules, and/or other systems or devices external to the client devices 1002*a*-1002*c*.

In some embodiments, a map service may be implemented by one or more nodes in a distributed computing system. Each node may be assigned one or more services or component of a map service. Some nodes may be assigned the same map service or component of a map service. A load balancing node may distribute access or requests to other nodes within a map service. In some embodiments a map service may be implemented as a single system, for example a single server. Different modules or hardware devices within a server may implement one or more of the various services provided by a map service.

A map service may provide map services by generating map service data, which a map service may compose in varying formats for varying services. In some embodiments, one format of map service data may be map image data. Map image data may provide image data to a client device so that the client device may process the image data (e.g., rendering and/or displaying the image data as a two-dimensional or three-dimensional map). Map image data, whether in two or three dimensions, may be composed utilizing map tiles. A map tile is a portion of a larger map image. Assembling together the map tiles of a map may produce the original map. Tiles may be composed of map image data, routing or navigation data, or any other map service data. In some embodiments map tiles may be raster-based map tiles, with tile sizes ranging from any size both larger and smaller than the standard 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles may be vector-based map tiles, encoded using vector graphics, including, but not limited to, Scalable Vector Graphics (.svg) or Drawing File (.drw). Embodiments may also include tiles with a combination of vector and raster data. Metadata or other information concerning the map tile may also be included within or along with a map tile, providing further map service data to a client device. It will be apparent to those of ordinary skill in the art that a map tile may be encoded for transport utilizing various well-known data structures and protocols, some of which are described in various examples below.

A map service may perform various techniques to analyze a map tile before encoding the tile for transport. This analysis may optimize map service performance for both client devices and a map service. In some embodiments map tiles may be analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile may contain certain mask values, which are associated with one or more textures. Embodiments may also analyze map tiles for specified features that may be associated with certain map styles that contain style identifiers.

Other map services may generate map service data relying upon various data formats separate from a map tile. For example, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Embodiments may format requests for a map as requests for certain map tiles. In some embodiments, requests may also supply the map service with starting locations (or current locations) and destination locations for a route calculation. A client device may also request map service rendering information, such as map textures or stylesheets. In at least some embodiments, requests may also be one of a series of requests implementing turn-by-turn navigation. Requests for other geographic data may include, but are not limited to, current location, wireless network coverage, weather, traffic information, or nearby points-of-interest.

A map service may, in some embodiments, may analyze client device requests to optimize a device or map service operation. For example, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices 1002a-1002c may be implemented. One such example is a portable-multifunction device illustrated in FIGS. 1 through 3. Client devices 1002a-1002c may utilize map service 1030 through various communication methods and protocols described below. In some embodiments, client devices 1002a-1002c may obtain map service data from map service 1030. Client devices 1002a-1002c may request or receive map service data. Client devices 1002a-1002c may then process map service data (e.g., render and/or display the data) and may send the data to another software or hardware module on the device or to an external device or system.

A client device may, according to some embodiments, implement techniques to render and/or display maps. These maps may be requested or received in various formats, such as map tiles described above. A client device may render a map in two-dimensional or three-dimensional views. Some embodiments of a client device may display a rendered map and allow a user, system, or device providing input to manipulate a virtual camera in the map, changing the map display according to the virtual camera's position, orientation, and field-of-view. Various forms and input devices may be implemented to manipulate a virtual camera. In some embodiments, touch input, through certain single or combination gestures (e.g., touch-and-hold or a swipe) may manipulate the virtual camera. Other embodiments may allow manipulation of the device's physical location to manipulate a virtual camera. For example, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Embodiments may provide various visual feedback to virtual camera manipulations, such as displaying an animation of possible virtual camera manipulations when transitioning from two-dimensional map views to three-dimensional map views. Embodiments may also allow input to select a map feature or object (e.g., a building) and highlight the object, producing a blur effect that maintains the virtual camera's perception of three-dimensional space.

In some embodiments, a client device may implement a navigation system (e.g., turn-by-turn navigation). A navigation system provides directions or route information, which may be displayed to a user. Embodiments of a client device may request directions or a route calculation from a map service. A client device may receive map image data and route data from a map service. In some embodiments, a client device may implement a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera may be implemented to manipulate navigation map data according to some embodiments. Some embodiments of client devices may allow the device to adjust the virtual camera display orientation to bias toward the route destination. Embodiments may also allow virtual camera to navigation turns simulating the inertial motion of the virtual camera.

Client devices may implement various techniques to utilize map service data from map service. Embodiments may implement some techniques to optimize rendering of two-dimensional and three-dimensional map image data. In some embodiments, a client device may locally store rendering information. For example, a client may store a stylesheet which provides rendering directions for image data containing style identifiers. In another example, common image textures may be stored to decrease the amount of map image data transferred from a map service. Client devices may also implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices may also order or prioritize map service data in certain techniques. For example, a client device may detect the motion or velocity of a virtual camera, which if exceeding certain threshold values, lower-detail image data will be loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices may communicate utilizing various data formats separate from a map tile. For example, some client devices may implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 10 illustrates one possible embodiment of an operating environment 1000 for a map service 1030 and client devices 1002a-1002c. In some embodiments, devices 1002a, 1002b, and 1002c can communicate over one or more wire or wireless networks 1010. For example, wireless network 1010, such as a cellular network, can communicate with a wide area network (WAN) 1020, such as the Internet, by use of gateway 1014. A gateway 1014 may provide a packet oriented mobile data service, such as General Packet Radio Service (GPRS), or other mobile data service allowing wireless networks to transmit data to other networks, such as wide area network 1020. Likewise, access device 1012 (e.g., IEEE 802.11g wireless access device) can provide communication access to WAN 1020. Devices 1002a and 1002b can be any portable electronic or computing device capable of communicating with a map service, such as a portable multifunction device described below with respect to FIGS. 1 to 3. Device 1002c can be any non-portable electronic or computing device capable of communicating with a map service.

In some embodiments, both voice and data communications can be established over wireless network 1010 and access device 1012. For example, device 1002a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1010, gateway 1014, and WAN 1020 (e.g., using Transmission Control Protocol/Internet Protocol (TCP/IP) or User Datagram Protocol (UDP)). Likewise, in some implementations, devices 1002b and 1002c can place and receive phone calls, send and receive e-mail messages, and retrieve electronic documents over access device 1012 and WAN 1020.

Devices 1002a and 1002b can also establish communications by other means. For example, wireless device 1002a can communicate with other wireless devices (e.g., other devices 1002a or 1002b, cell phones) over the wireless network 1010. Likewise devices 1002a and 1002b can establish peer-to-peer communications 1040 (e.g., a personal area network) by use of one or more communication subsystems, such as Bluetooth® communication from Bluetooth Special Interest Group, Inc. of Kirkland, Wash. 1002c can also establish peer to peer communications with devices 1002a or 1002b. (not pictured). Other communication protocols and topologies can also be implemented. Devices 1002a and 1002b may also receive Global Positioning Satellite (GPS) signals from GPS 1040.

Devices 1002a, 1002b, and 1002c can communicate with map service 1030 over the one or more wire and/or wireless networks, 1010 or 1012. For example, map service 1030 can provide a map service data to rendering devices 1002a, 1002b, and 1002c. Map service 1030 may also communicate with other services 1050 to obtain data to implement map services. Map service 1030 and other services 1050 may also receive GPS signals from GPS 1040.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   one or more orientation sensors configured to obtain orientation information regarding a current location of a user, wherein the orientation information comprises global positioning (GPS) information;
   a memory; and
   one or more processors coupled to the memory, wherein the memory comprises program instructions executable by the one or more processors to implement a navigation component configured to:
      generate a map display to be displayed in a display screen, wherein the map display includes at least a portion of a map and includes a position indicator that indicates the current location of the user on the map corresponding to the current location of the user, wherein the navigation component is configured to position the position indicator in a first position within the display screen, and wherein the navigation component is configured to pan or rotate the map relative to the position indicator in the first position within the display screen such that the position indicator represents the current location of the user on the map as the user changes physical locations;
      detect, based at least in part on orientation information from the one or more orientation sensors, that the user is turning in a direction of travel; and
      responsive to said detection:
         pan the map and rotate the map around the position indicator, while the user is turning, such that the position indicator shifts within the display screen in a direction opposite to said direction of travel while continuing to include more map information in the direction of travel in the display screen than if the position indicator remained in the first position, wherein the position indicator continues to indicate the current location of the user on the map while the position indicator is shifted and the map is rotated.

2. The system of claim 1, wherein the navigation component is configured to:
   detect that the user has ended said turning; and
   responsive to said detecting, pan the map such that the position indicator shifts within the map display to return the position indicator to said first position.

3. The system of claim 1, wherein to detect that the user is turning in said direction of travel, the navigation component is configured to:
   receive multiple position updates, from the one or more orientation sensors, specifying the user's position at different points in time; and
   evaluate the position updates to detect a trend in the user's position in order to determine that the user is turning in said direction of travel.

4. The system of claim 3, wherein the navigation component is configured to, during an initial portion of the user's turn, perform the receipt of the position updates and the determination that the user is turning.

5. The system of claim 1, wherein to detect that the user is turning in said direction of travel, the navigation component is configured to:
   receive orientation information from the one or more orientation sensors, wherein the one or more orientation sensors include one or more of: an accelerometer component, a gyroscope component or a magnetometer component; and
   evaluate the orientation information to determine that the user is turning in said direction of travel.

6. An electronic device, comprising:
   an electronic display;
   a positioning component configured to receive global positioning (GPS) information and determine a current location of the electronic device;
   a navigation component configured to:
      generate a graphical map to be displayed on the electronic display, wherein the graphical map includes at least a portion of a map and includes a position indicator that indicates a current location of a user on the map as specified by the positioning component, wherein the navigation component is configured to position the position indicator in a first position within the electronic display, and wherein the navigation component is configured to pan or rotate the map relative to the position indicator in the first position within the electronic display such that the position indicator represents the current location of the user on the map as the user changes locations;
      detect that the user is turning in a direction of travel based, at least in part, on information from the positioning component; and
      responsive to said detection:
         pan the map and rotate the map around the position indicator, while the user is turning, such that, the position indicator shifts within the electronic display in a direction opposite to said direction of travel to include more map information in the direction of travel in the electronic display than if the position indicator remained in the first position, wherein the position indicator continues to indicate the current location of the user on the map while the position indicator is shifted and the map is rotated.

7. The electronic device of claim 6, wherein the electronic display is a touch-responsive display.

8. The electronic device of claim 6, wherein navigation component is configured to determine and display a navigation route from an origination to a destination, wherein said turning is detected as a turn on the navigation route.

9. The electronic device of claim 8, wherein to determine the navigation route, the navigation component is configured to:
   evaluate the map to determine one or more candidate routes from the origination to the destination, and
   select said navigation route from said one or more candidate routes.

10. The electronic device of claim 8, wherein to determine the navigation route, the navigation component is configured to:

send a route request to a remote service, the route request specifying the origination and the destination; and receive from the remote service, a response specifying the navigation route.

11. A computer-implemented method, comprising:

generating a map display to be displayed in a display screen, wherein the map display includes at least a portion of a map and includes a position indicator that indicates a current location of a user on the map corresponding to a current physical location of the user, wherein the position indicator is positioned in a first position within the display screen, and wherein the map is panned or rotated relative to the position indicator in the first position within the display screen such that the position indicator represents the current location of the user on the map as the user changes physical locations;

obtaining global positioning (GPS) information regarding a current location of the user;

evaluating, based, at least in part, on the obtained GPS information, a navigation route to determine that the user is expected to turn in a direction of travel; and responsive to a determination that the user is expected to turn in said direction of travel, panning the map and rotating the map around the position indicator, while the user is turning, such that the position indicator shifts within the display screen in a direction opposite to said direction of travel to include more map information in the direction of travel in the display screen than if the position indicator remained in the first position, wherein the position indicator continues to indicate the current location of the user on the map while the position indicator is shifted and rotated.

12. The computer-implemented method of claim 11, wherein the method comprises generating said navigation route based on a route origination and a route destination.

13. The computer-implemented method of claim 11, wherein the method comprises:

sending a route request to a remote service, the route request specifying the origination and the destination; and receiving from the remote service, a response specifying the navigation route.

14. The computer-implemented method of claim 11, wherein evaluating the navigation route to determine that the user is expected to turn in said direction of travel comprises:

determining a current position of the user on the navigation route;

identifying a subsequent turn that follows said current position on the navigation route.

15. A non-transitory computer-readable storage medium, storing program instructions computer-executable on a computer to implement a mapping application configured to:

receive orientation information from one or more orientation sensors regarding a current position of a user:

display a map of a geographic region within a display window;

display on the map a graphical indicator of the user's current position within said geographic region, wherein the mapping application is configured to position the graphical indicator in a first position in the display window, and wherein the mapping application is configured to pan or rotate the map of the geographic region displayed within the display window relative to the graphical indicator in the first position within the display window such that the graphical indicator indicate the current position of the user within the geographic region as the user changes positions in the geographic region;

detect that the user is turning in a direction of travel or is expected to turn in said direction of travel; and responsive to said detection:

pan the map and rotate the map around the graphical indicator, while the user is turning, such that the graphical indicator shifts within the display window in a direction opposite to said direction of travel to include more map information in the direction of travel in the display window than if the graphical indicator remained in the first position, wherein the graphical indicator continues to indicate the current position of the user in the geographic region while the graphical indicator is shifted and the map is rotated.

16. The non-transitory computer-readable storage medium of claim 15, wherein the mapping application is further configured to, responsive to detecting the user has completed said turning, pan the map to return the position indicator to the first position.

17. The non-transitory computer-readable storage medium of claim 15, wherein the mapping application is configured to:

generate a navigation route from an origination to a destination; and superimpose a graphical representation of the navigation route on said map.

18. The non-transitory computer-readable storage medium of claim 17, wherein to detect that the user is expected to turn in said direction of travel, the mapping application is configured to evaluate the navigation route to:

determine a current position of the user on the navigation route; and identify a subsequent turn that follows said current position on the navigation route.

19. The non-transitory computer-readable storage medium of claim 15, wherein the mapping application is configured to execute on a touch-responsive multifunction device.

20. A multifunction device, comprising:

a touch-responsive display;

a positioning component configured to receive global positioning (GPS) information and determine a current location of the multifunction device;

one or more processors;

one or more memories storing a mapping application executable on the one or more processors to:

receive position information from the positioning component, the positioning information specifying the location of the multifunction device within a geographic region at different instances in time;

generate a graphical map to be displayed on the touch-responsive display, wherein the graphical map includes at least a portion of a map and includes a position indicator that indicates a current location of the multifunction device on the graphical map corresponding to a current physical location of the multifunction device based on the position information, wherein the mapping application is executable to position the position indicator in a first position on the touch-responsive display, and wherein the mapping application is executable to pan or rotate the map relative to the position indicator such that the position indicator in the first position on the touch-responsive display such that the position indicator indicates the current location of the multifunction device in the geographic region as the multifunction device changes locations in the geographic region;

detect that the multifunction device is turning in a direction of travel based, at least in part, on information from the positioning component; and responsive to said detection:

pan the map and rotate the map around the position indicator, while the multifunction device is turning, such that the position indicator shifts within the electronic display in a direction opposite to said direction of travel to include more map information in the direction of travel in the electronic display than if the position indicator remained in the first position, wherein the position indicator continues to indicate the current location of the multifunction device on the map while the position indicator is shifted and the map is rotated.

21. The multifunction device of claim 20, wherein the mapping application is configured to, responsive to detecting that the user has ended said turning, pan the map within the electronic display to return the position indicator to said first position.

22. The multifunction device of claim 20, further comprising a network interface, wherein the mapping application is configured to receive new map information through said network interface.

23. The multifunction device of claim 20, wherein the mapping application is configured to send a route request to a remote server, wherein the route request comprises a destination and a current location of the multifunction device as specified by the positioning component.

24. The multifunction device of claim 23, wherein the mapping application is configured to, subsequent to sending the route request, receive from the remote server one or more candidate routes from said current location to the destination.

* * * * *